UNITED STATES PATENT OFFICE.

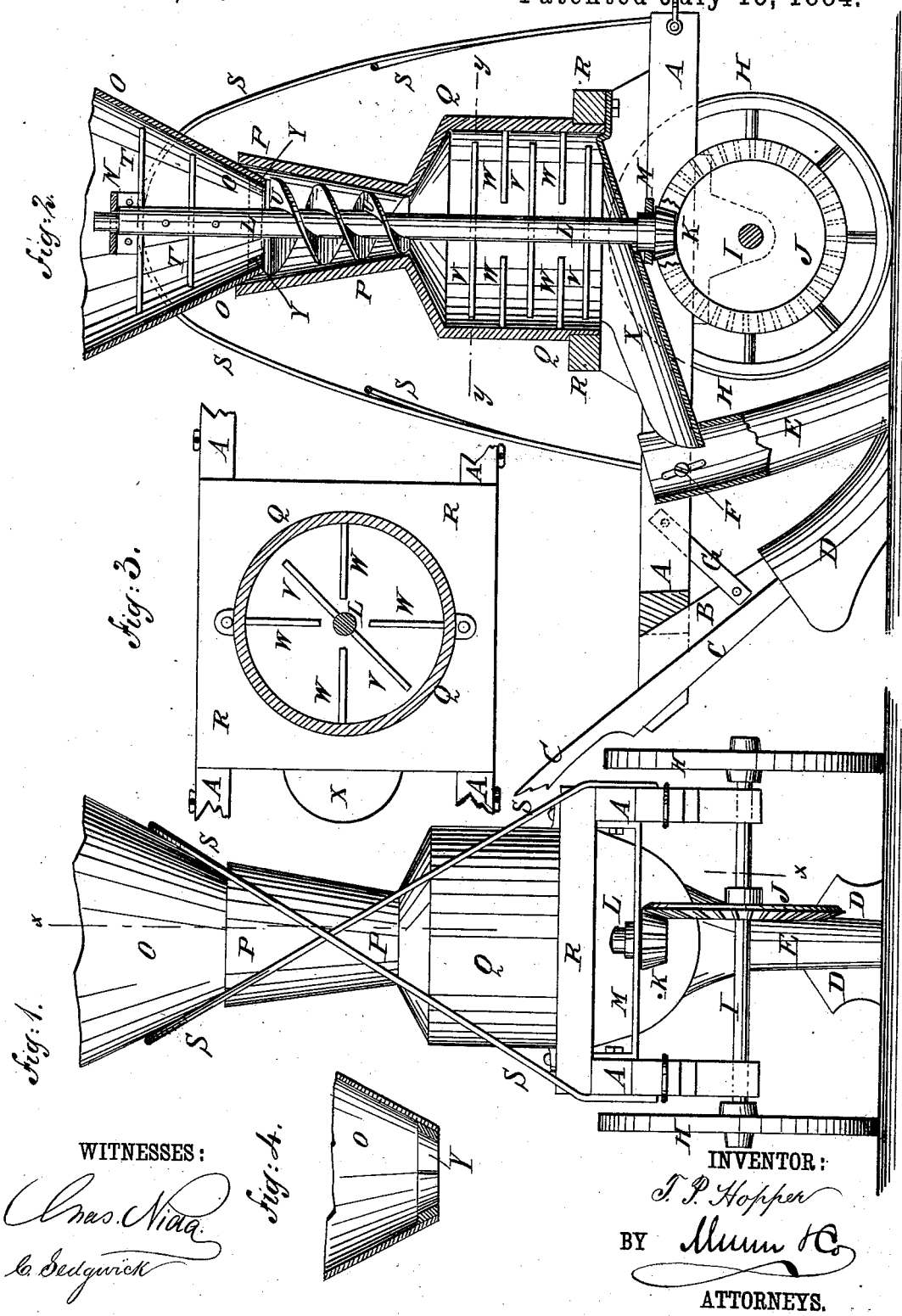

THOMAS PINKNEY HOPPER, OF SHERMAN, TEXAS.

COTTON-SEED PLANTER.

SPECIFICATION forming part of Letters Patent No. 301,989, dated July 15, 1884.

Application filed October 9, 1883. (No model.)

*To all whom it may concern:*

Be it known that I, THOMAS PINKNEY HOPPER, of Sherman, in the county of Grayson and State of Texas, have invented a new and useful Improvement in Cotton-Seed Planters, of which the following is a full, clear, and exact description.

Reference is to be had to the accompanying drawings, forming a part of this specification, in which similar letters of reference indicate corresponding parts in all the figures.

Figure 1 is a front elevation of my improvement. Fig. 2 is a sectional side elevation of the same, taken through the line *x x*, Fig. 1. Fig. 3 is a sectional plan view of a part of the same, taken through the line *y y*, Fig. 2. Fig. 4 is a sectional elevation of the lower part of the hopper, showing a means for regulating the discharge-opening in the bottom of the hopper.

The object of this invention is to facilitate the planting of cotton-seed and promote uniformity in the discharge of the seed from the planter.

The invention consists of the combination and disposition of parts, substantially as hereinafter fully set forth and claimed.

A is the planter-frame, to the rear part of which are attached the standard B and the handles C.

To the lower ends of the standard B and handles C is attached the plow D, which is made with two mold-boards or wings having their lower edges or shares so formed as to smooth off the top of the ridge and leave the seed covered to a uniform depth. The point of the plow D enters a hole in the rear lower part of the hoe E, which is made tubular to serve as a spout to conduct the seed to the ground. The sides of the upper part of the hoe E are slotted to receive the bolts F, that secure the said hoe to the frame A, so that the said hoe can be adjusted higher or lower, as may be required. The standard B is strengthened against the draft-strain by a brace, G, attached to it and to the frame A.

The plow D and hoe E are constructed as described in Letters Patent No. 266,154, issued to me October 17, 1882.

H are the drive-wheels, which are attached to the ends of the shaft I, so as to carry the said shaft with them in their revolution. The shaft I revolves in bearings attached to the frame A, and to its middle part is attached a large beveled gear-wheel, J, the teeth of which mesh into the teeth of the small beveled gear-wheel K, attached to the lower end of the vertical shaft L. The lower part of the shaft L revolves in bearings in a cross-bar, M, attached to the frame A, and its upper end revolves in bearings in a cross-bar, N, attached to the hopper O. The lower part or the whole of the hopper O is made funnel-shaped, and its lower end is attached to the upper end of the tapering tube P.

Upon the lower end of the tapering tube P is formed, or to it is attached, a chamber, Q, the lower end of which is secured to a platform, R, attached to the frame A. The hopper O is strengthened in position by braces S, attached to it and to the frame A.

To the part of the shaft L within the hopper O are attached radial pins T to stir the seed and cause it to pass freely into the tapering tube P.

Upon the part of the shaft L within the tapering tube P is formed, or to it is attached, a tapering screw, U, by which the seed is fed through the said tapering tube P.

To the part of shaft L within the chamber Q are attached radial pins V, which are placed one above the other in the same vertical plane, and which pass between inwardly-projecting radial pins W, attached to the wall of the chamber Q, so as to separate and scatter the seed as it falls from the tube P and prevent the seed from passing to the ground in bunches.

From the distributing-chamber Q the seed falls upon the inclined apron or spout X, the upper end of which is attached to the platform R. The lower end of the spout X rests in a recess formed in the forward side of the upper end of the hoe E, as shown in Fig. 2.

In the interior of the lower end of the hopper O is placed an open check-ring, Y, to regulate the quantity of seed that passes to the tapering tube P. The check-ring Y may be secured to the hopper O by screws passing through slots in the said ring or hopper, so that the check-ring can be adjusted higher or lower to regulate the quantity of seed discharged; or several check-rings of different thicknesses can be used and changed to regulate the quantity of seed discharged. With this construction the seed will be fed from the hopper regularly and in uniform quantity, and will be separated before it is dropped to the ground.

Having thus described my invention, I claim as new and desire to secure by Letters Patent—

1. A cotton-seed planter constructed substantially as herein shown and described, and consisting of the hopper, the tapering feed-tube, the distributing-chamber provided with inwardly-projecting radial pins, the discharge-spout, and the shaft provided at its upper end with stirrer-pins, at its middle part with a tapering feed-screw, and at its lower part with distributing-pins, as set forth.

2. In a cotton-seed planter, the combination, with the hopper O, the tapering feed-tube P, and the shaft L, provided with a tapering feed-screw, U, and stirrer-pins T, of the distributing-chamber Q, the stationary pins W, and the rotating pins V, attached to the shaft L, substantially as herein shown and described, whereby the seed is separated as it escapes from the tapering feed-tube, as set forth.

THOMAS PINKNEY HOPPER.

Witnesses:
T. E. LEWIS,
J. M. STINNETT.